US008667409B2

(12) United States Patent
Cherry et al.

(10) Patent No.: US 8,667,409 B2
(45) Date of Patent: Mar. 4, 2014

(54) SYSTEMS AND METHODS FOR HANDLING FOCUS OF APPLICATION USER INTERFACE ELEMENTS

(75) Inventors: Sebastien Cherry, St-Lambert (CA); Michel Martin, Laval (CA)

(73) Assignee: SAP AG, Walldorf (DE)

( * ) Notice: Subject to any disclaimer, the term of this patent is extended or adjusted under 35 U.S.C. 154(b) by 586 days.

(21) Appl. No.: 11/261,582

(22) Filed: Oct. 31, 2005

(65) Prior Publication Data
US 2007/0101293 A1     May 3, 2007

(51) Int. Cl.
*G06F 3/00* (2006.01)
*G06F 3/048* (2013.01)

(52) U.S. Cl.
USPC ........... 715/767; 715/760; 715/764; 715/781; 715/802

(58) Field of Classification Search
USPC ....................................................... 715/767
See application file for complete search history.

(56) References Cited

U.S. PATENT DOCUMENTS

| | | | | |
|---|---|---|---|---|
| 6,597,314 | B1* | 7/2003 | Beezer et al. | 715/812 |
| 6,892,360 | B1* | 5/2005 | Pabla et al. | 715/802 |
| 6,968,509 | B1* | 11/2005 | Chang et al. | 715/802 |
| 7,082,577 | B1* | 7/2006 | Brosnahan | 715/860 |
| 7,149,981 | B1* | 12/2006 | Lundy et al. | 715/767 |
| 2003/0005174 | A1* | 1/2003 | Coffman et al. | 709/318 |
| 2004/0250279 | A1* | 12/2004 | Billmaier et al. | 725/52 |
| 2005/0086609 | A1* | 4/2005 | Cohen | 715/767 |
| 2005/0132018 | A1* | 6/2005 | Milic-Frayling et al. | 709/213 |
| 2007/0214426 | A1* | 9/2007 | Ruelle et al. | 715/767 |
| 2007/0234206 | A1* | 10/2007 | Yamabuchi et al. | 715/526 |

OTHER PUBLICATIONS

Screenshots of Microsoft's Internet Explorer 6 SP2, Aug. 6, 2004.*
Damon Armstrong, Implementing Cross-Browser Compatible Smart Navigation Features, Jun. 12, 2005, 27 pages.*
Page.SmartNavigation Property, Apr. 3, 2003, 1 page.*
Simon McEnlly, Automatically set control focus after asp.net AutoPostBack, Jun. 28, 2005, 5 pages.*
McGiv, asp.net Client Side Focus Helper, Jan. 19, 2004, 5 pages.*
SmartNavigation: Friend of Foe?, May 27, 2005, 2 pages.*
Question: maintaining focus between pages, Aug. 6, 2004, 5 pages.*
Justin Lovell, Keeping Scroll Positions over post Backs, Jan. 20, 2004, 4 pages.*
How exactly does Smart Navigation work, Jan. 4, 2004, 6 pages.*
Re: alternatives to SmartNavigation, Aug. 28, 2003, 5 pages.*
Crossbrowser SmartNavigation Alternative, Dec. 3, 2004, 7 pages.*
Add Scrolling to a CWnd or CDialog using a C++ Helper Class, Jul. 5, 2005, 9 pages.*

(Continued)

*Primary Examiner* — Matt Kim
*Assistant Examiner* — Yongjia Pan
(74) *Attorney, Agent, or Firm* — Mintz, Levin, Cohn, Ferris, Glovsky and Popeo, P.C.

(57) ABSTRACT

Systems and methods for setting the focus of an application page after that page is reloaded are provided. Systems for setting focus may comprise a processor coupled to a memory. The processor may be operative to load an application page having two or more elements. The processor may be operative to track which of the one of the two or more elements is in focus. The processor may be operative to reload the application page in response to a server call. The processor may be operative to restore focus of the application page on the element of the application page most recently in focus prior to reloading.

12 Claims, 11 Drawing Sheets

(56) References Cited

OTHER PUBLICATIONS

SmartNavigation and why not to use it, Apr. 27, 2003, 6 pages.*
iFrame Scroll Position Problem, Jul. 21, 2005, 8 pages.*
How to: Set Focus on asp.net Web Server Controls, Oct. 27, 2005, 5 pages.*
Onbeforeunload Function, accessed Jul. 28, 2013, 3 pages.*
Onload Function, accessed Jul. 28, 2013, 4 pages.*
Vladimir Perlov, How to do Smart Navigation Handler in JavaserverTM Faces, Feb. 4, 2005.*
window.onunload handler is fired on load, Mar. 16, 2003, 4 pages.*
Firefox won't create cookies offline, Jan. 24, 2005, 3 pages.*

* cited by examiner

B2B Complaints And Returns

Transactions | Reference Documents

30 Documents Found

| ID | Created At | Your reference number |
|---|---|---|
| 5004345 | 15.02.2005 | |
| 5004308 | 15.02.2005 | |
| 5004307 | 15.02.2005 | |
| 5004305 | 15.02.2005 | |
| 5004348 | 15.02.2005 | |
| 5004406 | 16.02.2005 | |
| 5004322 | 16.02.2005 | |
| 5004563 | 22.02.2005 | |
| 5004562 | 22.02.2005 | |
| 5004564 | 22.02.2005 | TEST |
| 5004565 | 22.02.2005 | TEST |
| 5004735 | 01.03.2005 | |
| 5004736 | 01.03.2005 | |
| 5004770 | 02.03.2005 | |
| 5004790 | 02.03.2005 | |
| 5004857 | 07.03.2005 | |

Item - 1000 Olivier's WrongDeliv

Business partner settings for Item
Sold-To Party: 1614
Bill-To Party: 1614
Payer: 1614

▼ Predecessor documents:

| Type | Document | Item | Quantity |
|---|---|---|---|
| Invoice | 90000220 | 10 | 3 EA |
| Sales order | 5002049 | 10 | 3 EA |

602

▼ Additional complaint data

Status: Open
Product: TVMAT-02 TVMAT-02
Complaint quantity: 1 EA
Received quantity: 2 EA
Value: 10,00- EUR Return Information

[Back]

FIG. 11

SYSTEMS AND METHODS FOR HANDLING FOCUS OF APPLICATION USER INTERFACE ELEMENTS

TECHNICAL FIELD

The field of the invention relates generally to focusing an application user interface on elements contained therein, and more specifically to methods and systems for automatically setting focus when an application page reloads.

BACKGROUND

Computer applications, particularly Internet applications, often contain various user interface (UI) elements that may draw the focus of the user. The "in-focus" UI element is the element at which user-generated input is directed. A few examples of UI elements that may receive focus include, but are not limited to, links, buttons, drop-down lists, checkboxes, radio buttons, text fields, text areas, and images. During use of web applications, a web page is often required to reload in response to a server call. For instance, the web page may be required to populate a form field, or the user may direct the application to move to the next stage in a process, or return to a previous stage. After an application page is reloaded, focus is typically returned to the top of the page or to a UI element that the application designer has hard-coded as the default focused element, such as the address bar of an Internet application.

After a page is reloaded, users often desire to focus on the same element that was in focus prior to reloading. In such cases, the typical manner in which known applications handle focus is inefficient. Because the focus shifts automatically from the element on which the user was most recently focused to the top of the page or to a location hard-coded by the developer, the user must re-navigate through the page to the desired element, reducing the efficiency and usability of the application. This is particularly inefficient for users who prefer to navigate applications using the keyboard, as it may require numerous depressions of a button to "tab" through UI elements until reaching the desired element.

SUMMARY

A system for handling the focus of application elements may comprise a processor coupled to a memory. The processor may be operable to load an application page having two or more elements. The processor may further be operable to track which one of the one of the two or more elements is in focus. The processor may be operable to reload the application page in response to a server call. The processor may also be operable to restore focus of the application page on the element of the application page most recently in focus prior to reloading.

A method for handling the focus of application elements may comprise loading an application page having two or more elements. The method may comprise tracking which one of the one of the two or more elements is in focus. The method may further reloading the application in response to a server call. The method may also comprise restoring focus of the application page on the element of the application page most recently in focus prior to reloading.

A computer-readable medium storing a set of instructions that, when executed, performs a method for handling the focus of application elements. The computer-readable medium may be executed by the set of instructions comprising loading an application page having two or more elements.

The set of instructions may further comprise tracking which one of the two or more elements is in focus. The set of instructions may also comprise reloading the application page in response to a server call. The set of instructions may also comprise restoring focus of the application page on the element of the application page most recently in focus prior to reloading.

It is to be understood that both the foregoing general description and the following detailed description are exemplary and explanatory only and are not restrictive of the invention as claimed. The foregoing background and summary are not intended to provide any independent limitations on the claimed invention.

BRIEF DESCRIPTION OF THE DRAWINGS

The accompanying drawings, which are incorporated in and constitute a part of this specification, illustrate several implementations of the invention and together with the description, serve to explain the principles of the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention as claimed.

As embodied herein, a system for focusing application elements displayed on a user interface (UI) may improve the efficiency and usability of application user interfaces by preventing the need for the user to re-focus on a desired UI element each time a previously loaded page containing the element is reloaded. The system may be implemented by a memory containing instructions coupled to a processor operative to implement the instructions.

The focus-handling system may restore focus to any reloaded page within an application, regardless of how many pages are viewed between the original loading of the page and the subsequent reloading of the page. Thus, the system may restore focus to the appropriate element of a previously-used application page even when one or more other pages were viewed prior to reloading of the previously-used application page, rather than only allowing focus to be restored when a currently-viewed page is reloaded, such as to add new content. A focus-handling system consistent with an implementation of the present invention may return focus to the element most recently in focus prior to reloading the application page in response to a server call. The focus-handling system may store information pertaining to the element currently in focus in a temporary memory. The information collected by the focus-handling system for storage in the temporary memory may be termed a "focus record." Each time the user changes focus between elements, the focus-handling system may replace the focus record of the previously in-focus element currently stored in the temporary memory with the focus record of the newly in-focus element. When the page is reloaded in response to a server call, the focus-handling system may transfer the focus record stored in the temporary memory at the time of reloading into a focus history. When the application page is fully reloaded, the focus-handling system may check the history and set the focus to the element of that page most recently in focus prior to the reloading of the page. In a page comprising frames, the focus-handling system may refrain from setting focus until all frames within the page are loaded to ensure that the actual last element in focus receives focus upon reloading.

In order to allow the focus-handling system to properly set focus on the element in focus prior to reloading of a page, the system track which element on an application page is currently in focus. The system may also track when the application page is reloaded and may further check the focus history to determine whether focus should be reset to a particular element on the reloaded page. Consistent with the principles of the present invention, the focus-handling system may also be "reset," clearing the focus history of its record of previously in-focus elements. The first time a page is reloaded after the system is reset, the focus-handling system may operate as though the application was just launched, setting focus to the default element of that page, because no record pertaining to that application page is contained in the focus history.

Figure 1:
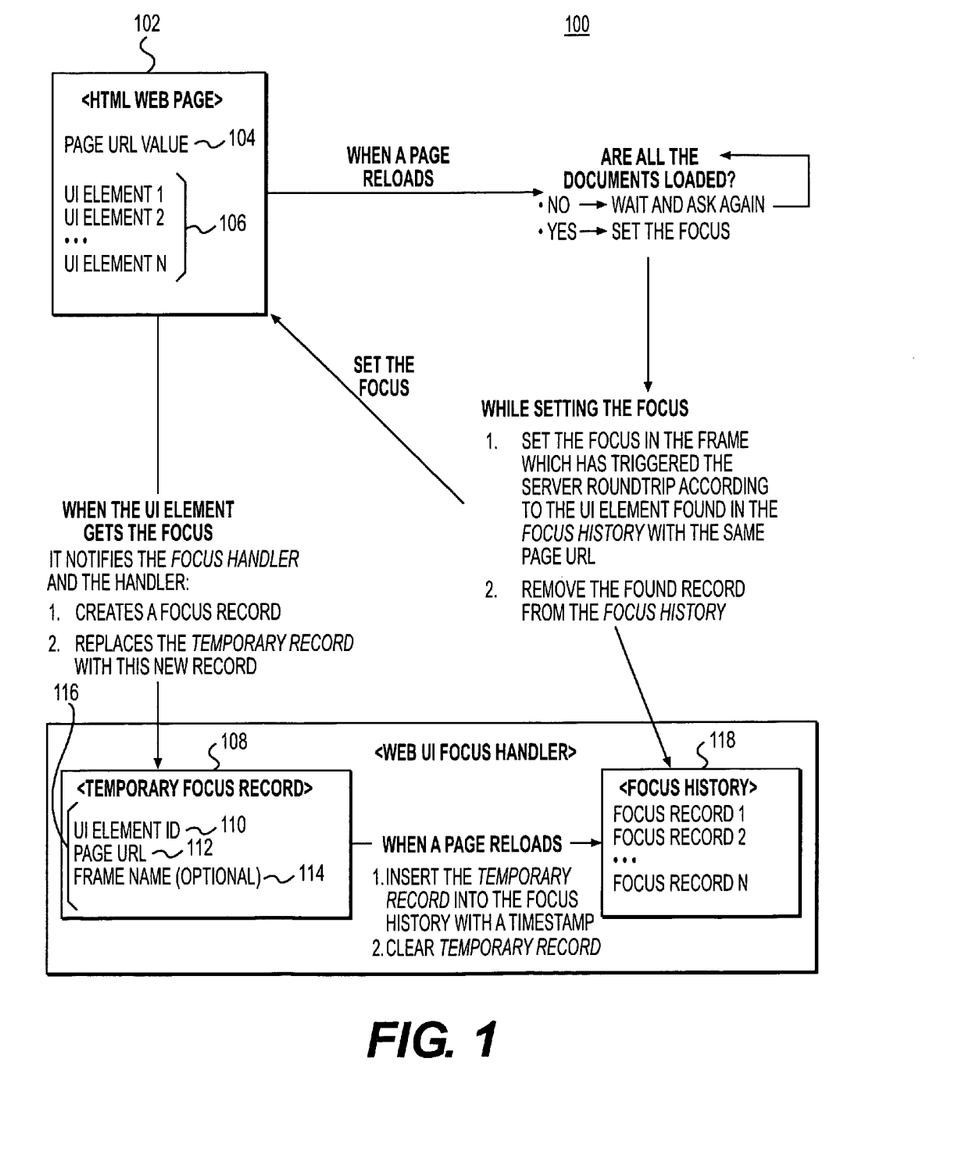
FIG. 1 is a flow diagram illustrating the operation of a focus-handling system consistent with an implementation of the present invention.

FIG. 1 is a flow diagram of the operation of a focus-handling system 100 consistent with an implementation of the present invention. An exemplary web application page 102 is shown having a uniform resource locator (URL) value 104. Application page 102 may include a number of UI elements 106. Examples of types of UI elements 106 include but are not limited to frames, links, buttons, fields, drop-down lists, radio buttons, check boxes, text areas and images. UI elements 106 may comprise a category of features that may capture the focus of a user. In the normal navigation of application page 102, a user may shift focus between the various UI elements 106. As shown in FIG. 1, when the user focuses on a UI element 106, focus-handling system 100 may store information pertaining to that UI element 106 in a temporary memory 108.

Temporary memory 108 may collect a variety of information regarding UI element 106, including, in applications utilizing frames, information necessary to identify the particular frame with which the element in associated. In one aspect consistent with the principles of the present invention, temporary memory 108 may collect information such as (i) an ID 110 associated with UI element 106, the particular uniform resource identifier (URI) value 112 associated with application page 102 on which UI element 106 is located and a page section 114 at which UI element 106 is located on application page 102. In one aspect, URL value 104 may be the resulting URI of application page 102 as opposed to the requested uniform resource locator associated with application page 102. It is recognized, however, that temporary memory 108 may include a wide variety of information regarding UI element 106, and that the above-listed variables are exemplary in nature only.

The information associated with each element 106 that is collected by temporary memory 108 may be collectively termed a focus record 116. Temporary memory 108 may store focus record 116 of whichever element 106 is currently in the user's focus—meaning that each time the user changes focus from one element 106 to another, temporary memory 108 may replace focus record 116 of the previously-in-focus element 106 with focus record 116 of the newly-in-focus element 106.

As further illustrated in FIG. 1, when application page 102 is reloaded, system 100 may insert whichever focus record 116 is stored in temporary memory 108 at that time in a focus history 118. Focus-handling system 100 may also clear focus record 116 out of temporary memory 108 each time application page 102 is reloaded, as that information is no longer relevant. Focus history 118 may store an unlimited number of focus records 116, or the capacity may be limited in various manners. For example, a focus record 116 may be deleted from focus history 118 after a certain period of time. Alternatively, focus history 118 may store a certain number of focus records 116, and to delete the oldest focus record 116 whenever the limit is exceeded. Focus history 118 may be stored in a persistent memory zone, such that its content is not deleted each time a page within application page 102 is reloaded. For example, focus history 118 may be implemented in a frameset document that is not reloaded in response to server calls.

Focus-handling system 100 may focus application page 102 on a UI element 106 after application page 102 is reloaded. System 100 may wait until all elements 106 are loaded before setting the focus. Once elements 106 are loaded, system 100 may determine which element 106 should be in focus on application page 102 by evaluating one or more focus records 116 stored in focus history 118 and determining which focus record 116 associated with URI 104 of application page 102 and stored in focus history 118 was most recently in the user's focus. Based on element ID 110 of focus record 116, system 100 may set the focus to the appropriate UI element 106.

In one aspect, focus history 118 may store only a single focus record 116 associated with a particular application page 102. In this aspect, when a focus record 116 associated with a particular application page 102 is imported into focus history 118, focus history 118 may discard a previously stored focus record 116 associated with that same page 102. Accordingly, when application page 102 is reloaded, system 100 need not determine which of a plurality of focus records 116 associated with page 102 was most recently in focus. In another aspect, a timestamp may be applied to focus record 116 when it is placed in focus history 118. Focus-handling system 100 may determine which element 106 should be placed in focus upon reloading of page 102 by determining which focus record 116 associated with page 102 has the most recent timestamp.

In one version, focus-handling system 100 may be incorporated into a software application page 102. Application page 102 may comprise a number of pages through which the user may navigate. If system 100 is incorporated into application page 102, it may store the most recently in-focus element 106 for each page contained in the application page 102. For example, if the user focuses on an element 106 of a first page of application page 102, then requests a second page of application page 102, system 100 may store the last-viewed element 106 of the first page in focus history 118. If the user then requested a third page of application page 102, system 100 may store the last-viewed element 16 of the second page in focus history 118. If the user then navigates back to either the first or second page of application page 102, system 100 may search focus history 118 and find the most recently stored focus record 116 matching the URI of the requested page of application page 102 and restore focus to the element 106 associated with that focus record 116.

In another version, focus-handling system 100 may be incorporated into an Internet browser and may track and recall the most recently in-focus element of each web page the browser visits. In this aspect, system 100 may operate in the manner described above, but because system 100 is incorporated into the web browser, system 100 may handle the focus of each application the user visits using the browser.

Figure 2:
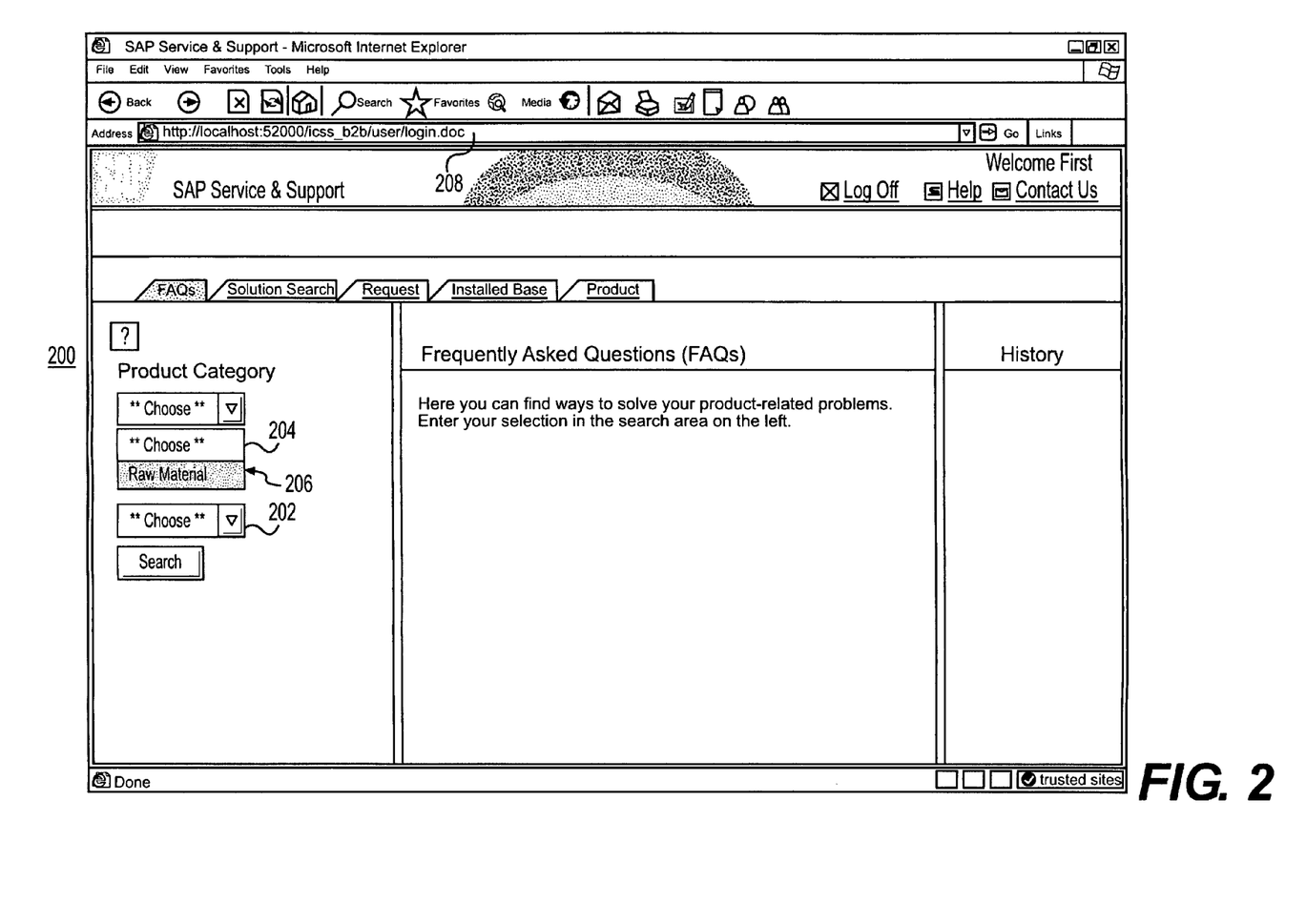
FIG. 2 is a screen shot of an exemplary application page with the focus on a particular UI element.
Figure 3:
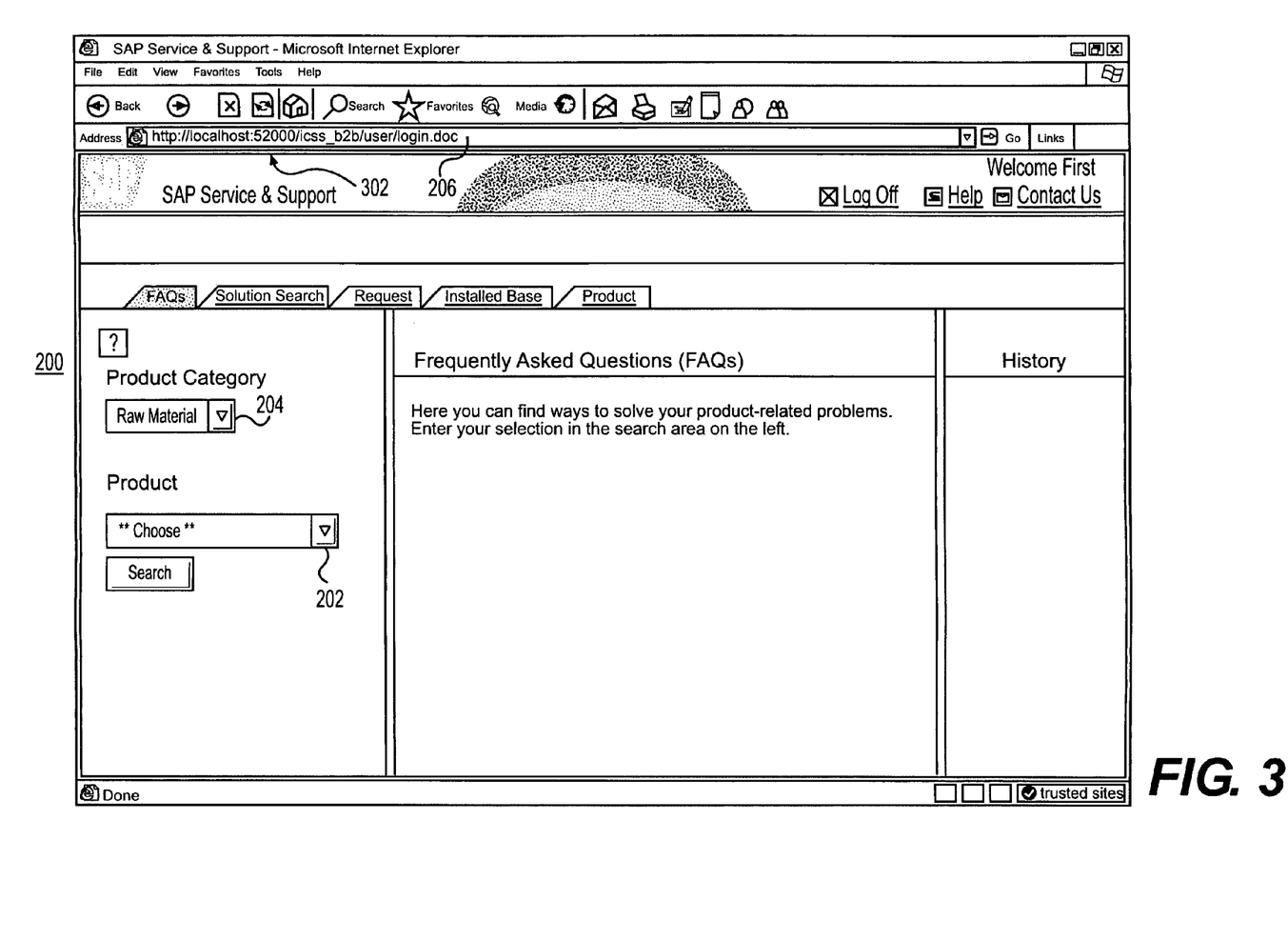
FIG. 3 is a screen shot of the exemplary application page of FIG. 2 after the application page has been reloaded in the manner currently known in the art.
Figure 4:
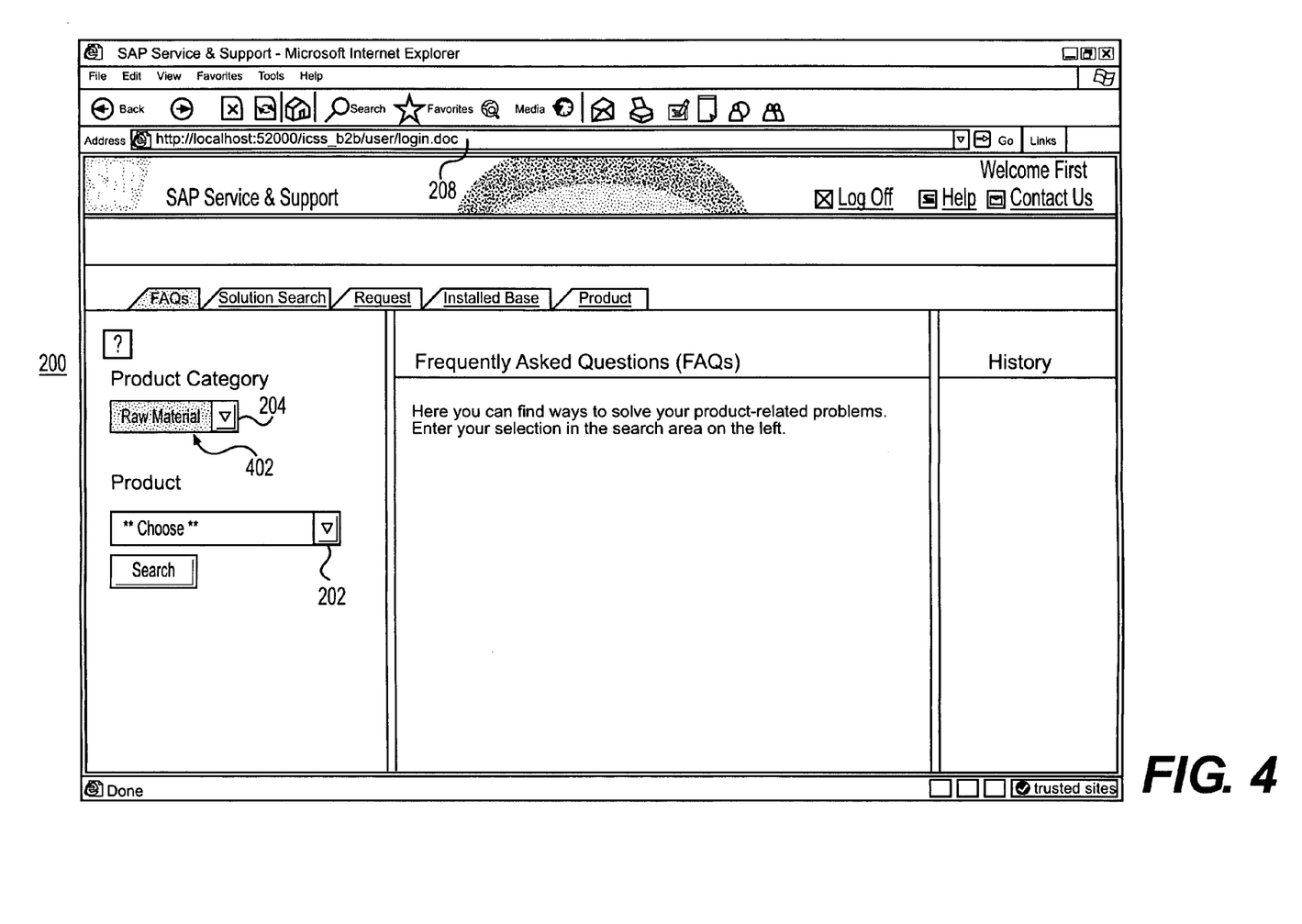
FIG. 4 is a screen shot of the exemplary application page of FIG. 2 after the application page has been reloaded in conjunction with a focus-handling system consistent with an implementation of the present invention.

FIG. 2 is a screen shot of an exemplary application page 200. Application page 200 contains a number of elements 202, including a particular element 204 that is in focus in FIG. 2 (as indicated by arrow 206) and an address bar 208. FIG. 3 shows application page 200 after it has been reloaded in the manner currently known in the art. Without the focus management provided by focus-handling system 100, the focus is shifted by application default from element 204 to address bar 208, as indicated by arrow 302. In contrast, FIG. 4 shows application page 200 after reloading in conjunction with a system 100 consistent with an implementation of the present invention, illustrating how system 100 may operate to track the user's focus on element 204 of application page 200 and to restore focus to element 204 after application page 200 reloads in response to a server call, as indicated by arrow 402. In this manner, the user is not required to navigate through application page 200 to reach element 204, the subject of the user's focus prior to reloading of application page 200.

Figure 5:
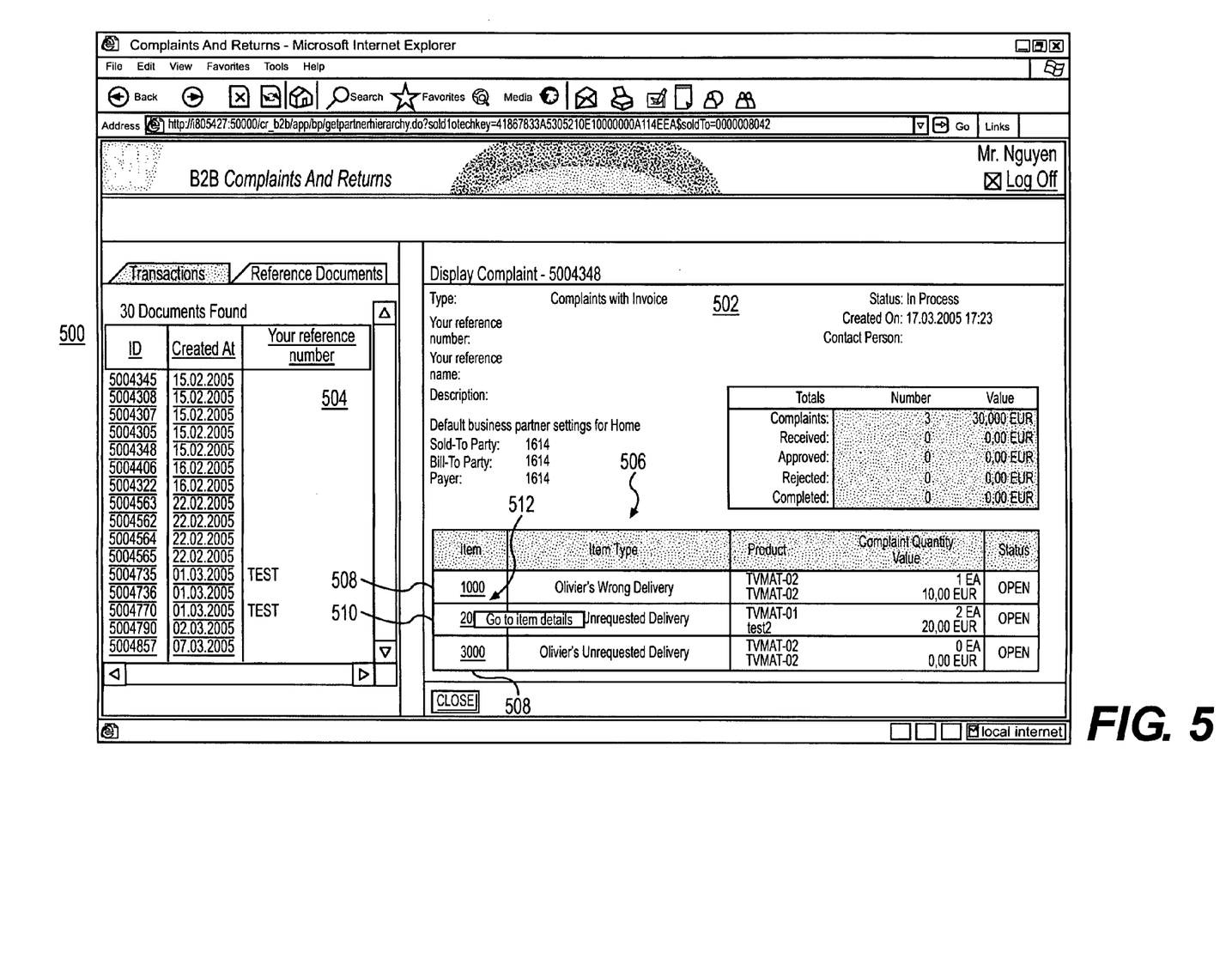
FIG. 5 is a screen shot of an exemplary application page with the focus on a particular UI element of first content loaded in a first frame.
Figure 6:
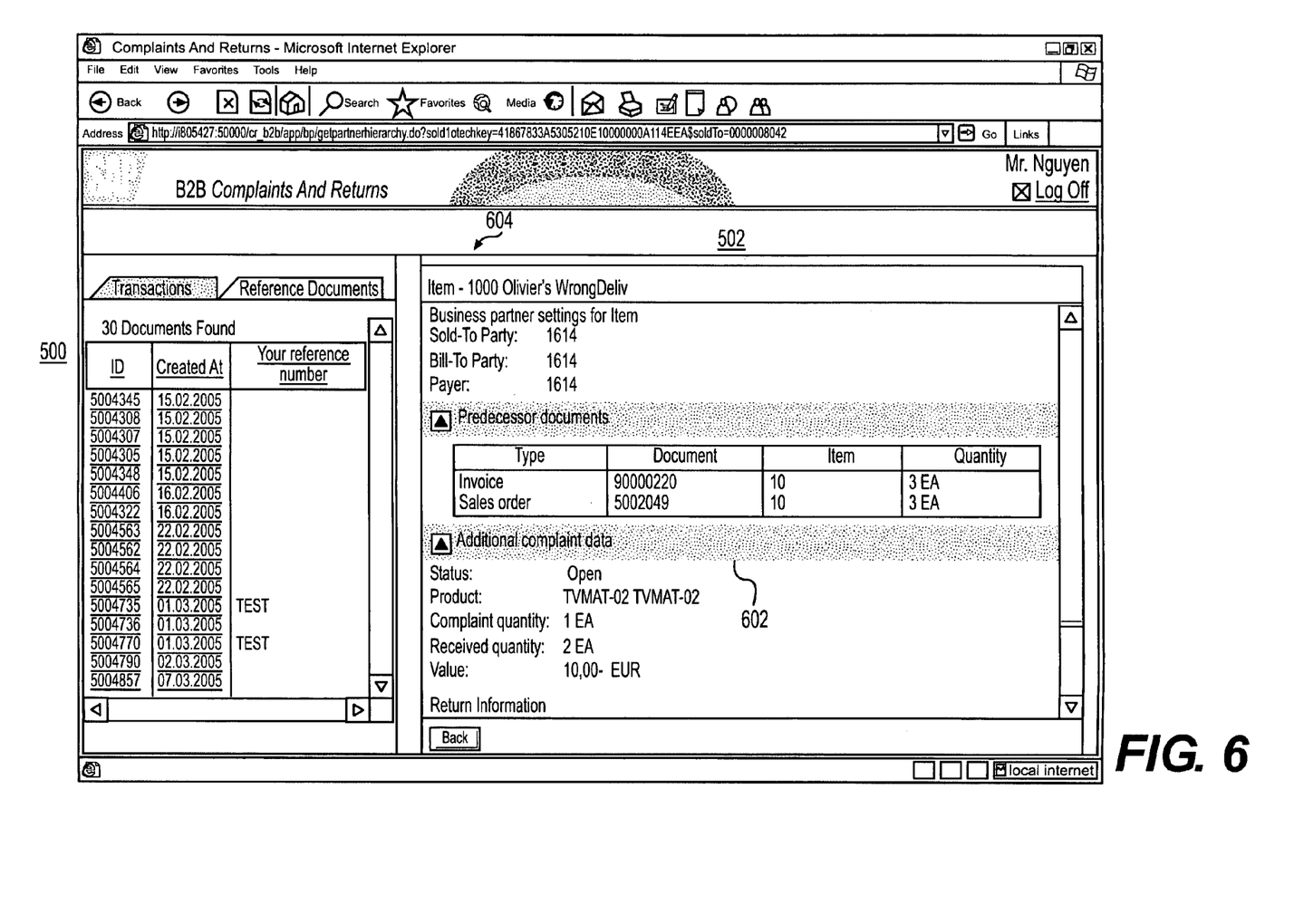
FIG. 6 is a screen shot of the exemplary application page of FIG. 5 with second content loaded in the first frame.

FIGS. 5 through 8 show another exemplary application page 500 containing a first frame 502 and a second frame 504. In FIG. 5, first frame 502 may contain first content 506. First content 506 may include a number of elements 508 and a particular element 510. In FIG. 5, application page 500 is focused on element 510 of content 506, as indicated by arrow 512. In FIG. 6, second content 602 has been loaded into first frame 502 and focus appears on first frame 502 (as indicated by arrow 604), because only that frame of application page 500 was reloaded.

Figure 7:
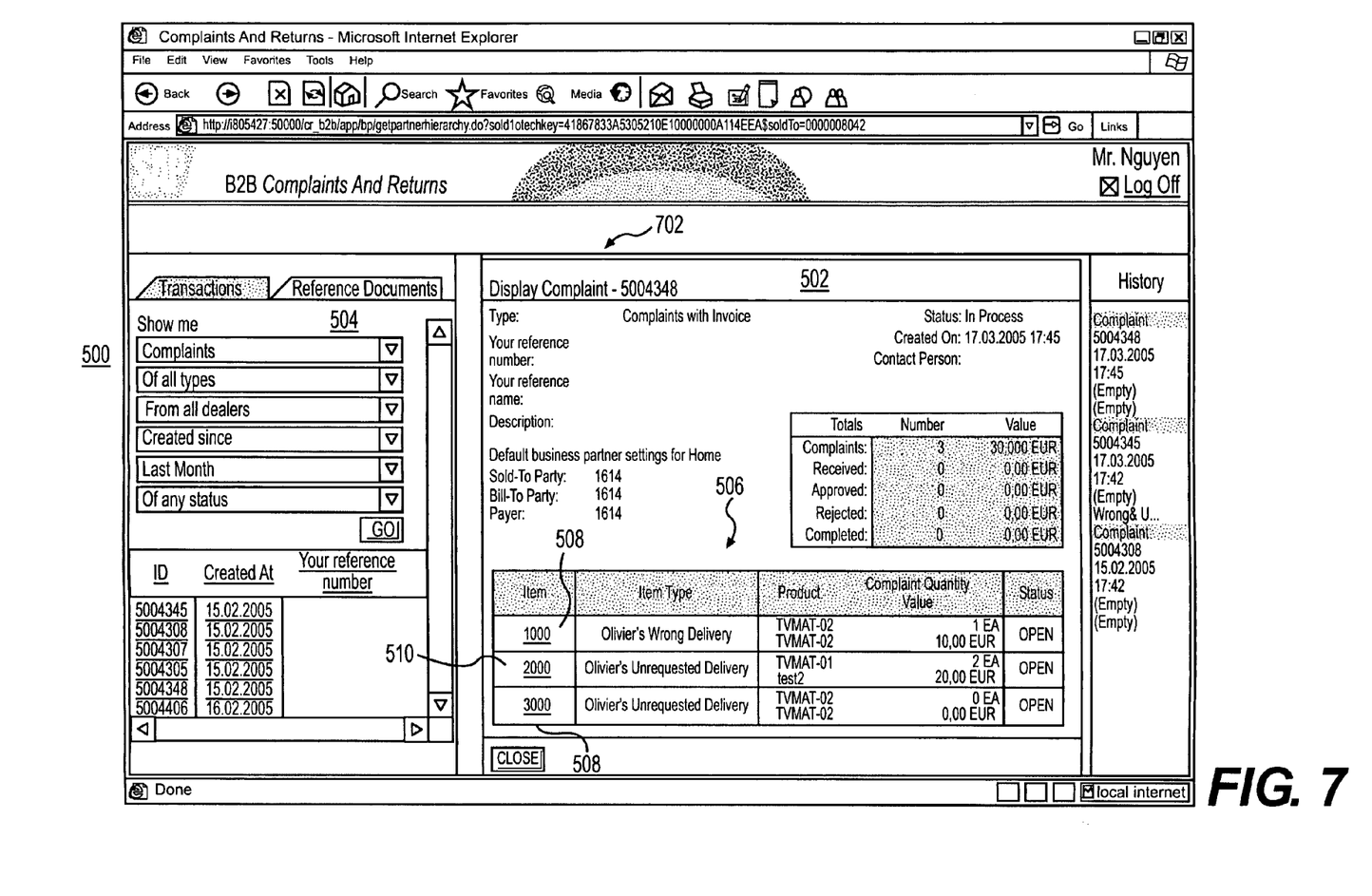
FIG. 7 is a screen shot of the exemplary application page of FIG. 5 with the first content reloaded in the first frame in the manner currently known in the art.

FIG. 7 illustrates the focus shifting occurring in application page 500 after a server call in systems known in the art. In FIG. 7, first content 506 may be reloaded into first frame 502 in response to a server call, causing focus to shift to first frame 502 rather than to element 510, which was in the user's focus prior to the loading of second content 602 into first frame 502.

Figure 8:
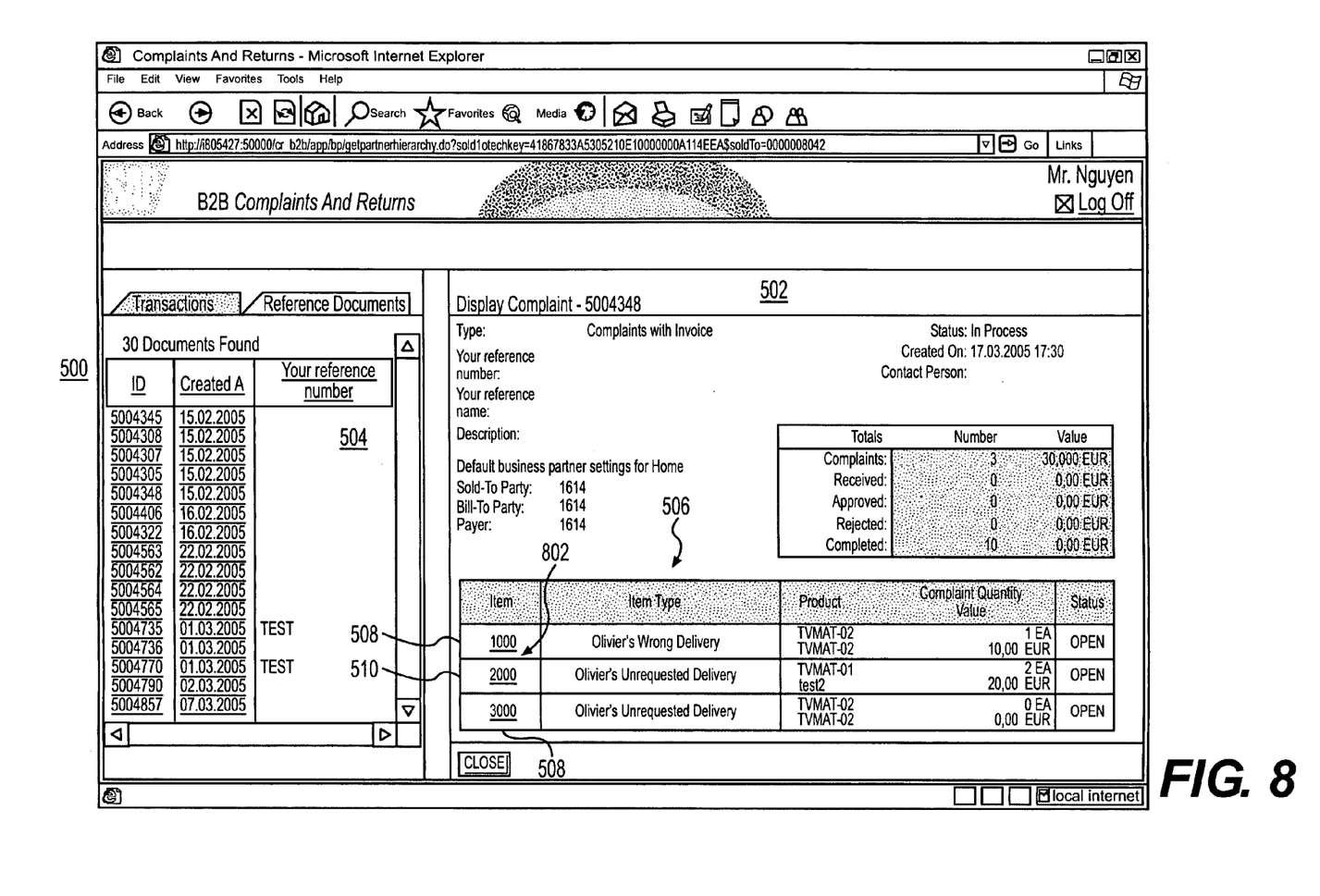
FIG. 8 is a screen shot of the exemplary application page of FIG. 5 with the first frame reloaded in conjunction with a focus-handling system consistent with an implementation of the present invention.

FIG. 8 illustrates the same operation as that shown in FIG. 7 in a system utilizing a focus-handling system consistent with the principles of the present invention. Application page 500 is shown with first content 506 reloaded into first frame 502 in conjunction with a system 100 consistent with an implementation of the present invention. As shown in FIG. 8, system 100 may operate to track the user's focus on element 510 of first content 506 prior to the loading of second content 602 into first frame 502, and to restore focus to element 510 (as indicated by arrow 802) after application page 500 reloaded first content 506 into first frame 502 in response to a server call. In this manner, the user is not required to re-navigate through first content 506 to reach element 510 after reloading of first content 506.

Consistent with the principles of the present invention, focus-handling system 100 may allow developers to bypass the normal execution of the focus-setting process in specific instances where the developer desires to set focus on a particular element or frame, rather than on the last element in focus prior to a server call.

Figure 9:
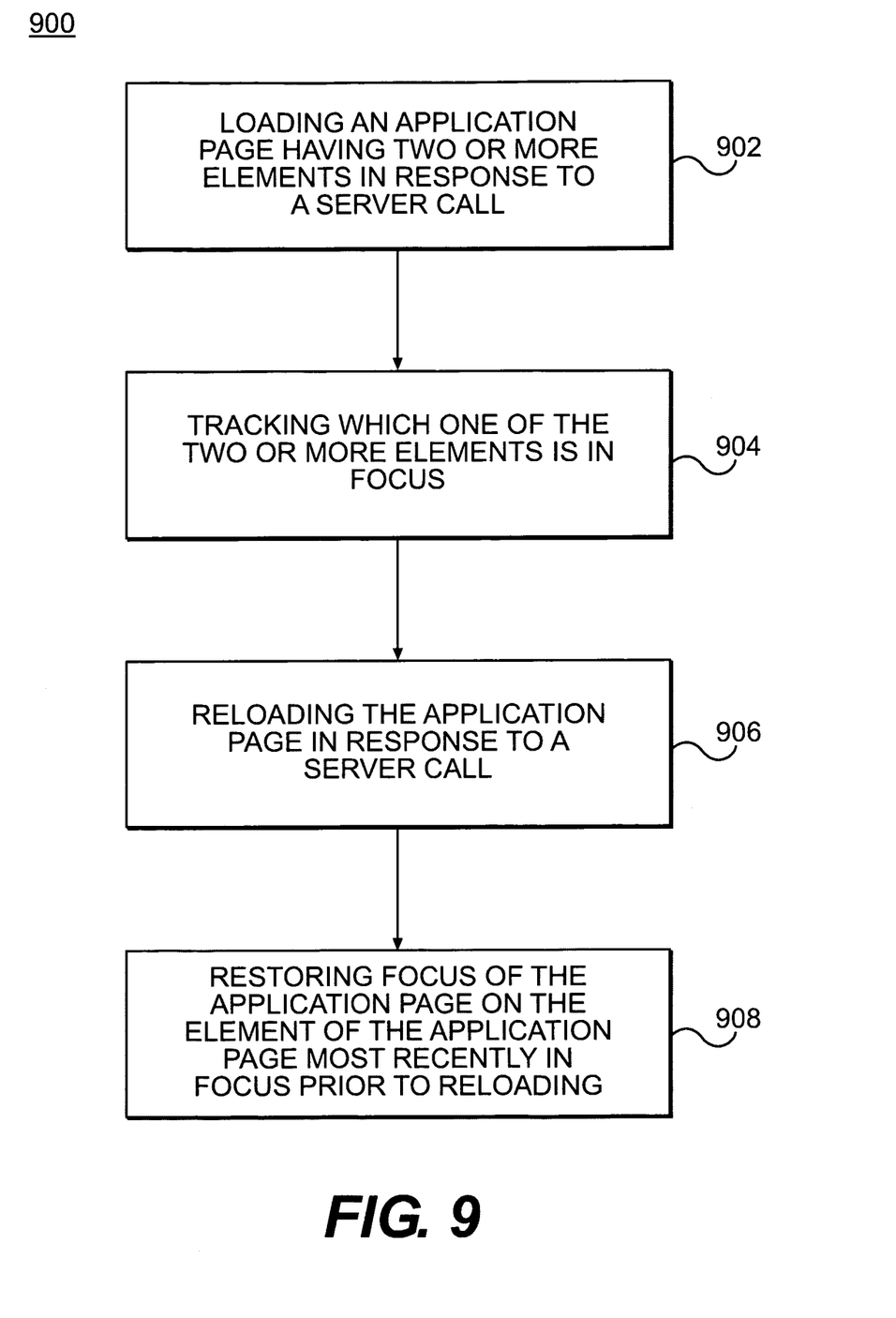
FIG. 9 is a flow chart illustrating the operation of a focus-handling system consistent with the principles of the present invention.

FIG. 9 is a flow chart illustrating the operation of a focus-handling system 900 consistent with the principles of the present invention. Focus-handling system 900 may load an application page having two or more elements in response to a server call (902). Focus-handling system 900 may track which one of the two or more elements is in focus (904). Focus-handling system 900 may reload the application page in response to a server call (906). Focus-handling system may restore focus of the application page on the element of the application page most recently in focus prior to reloading (908).

A computer system may be used to install a software application implementing a system and method for handling focus of Internet user interface elements consistent with an implementation of the present invention. The computer system may be a computer network, as shown in FIG. 10, or a stand-alone personal computer (PC), as shown in FIG. 11.

Figure 10:
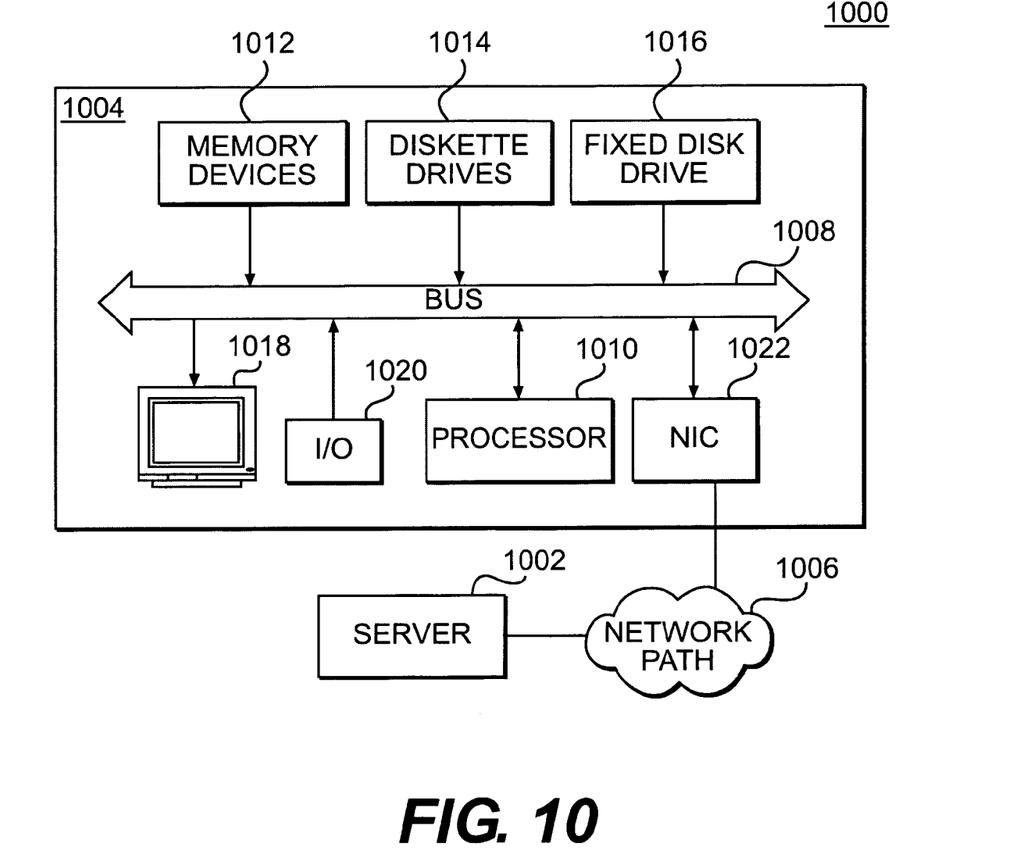
FIG. 10 illustrates a computer system for implementing a software application consistent with an implementation of the present invention.
Figure 11:
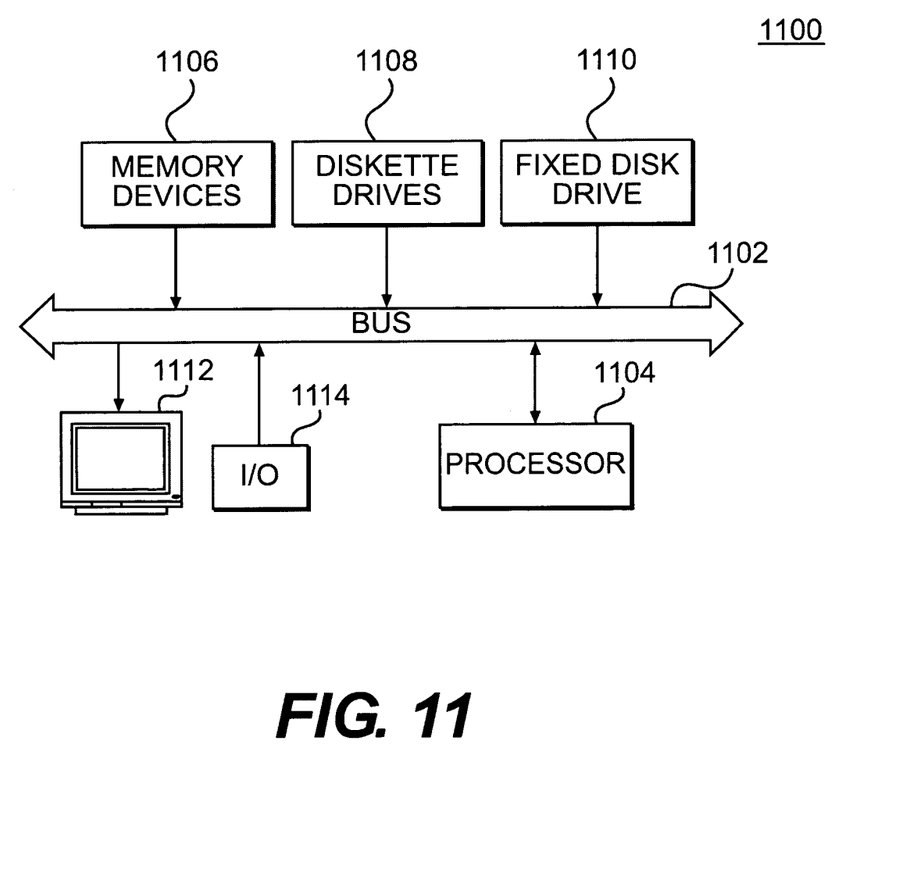
FIG. 11 illustrates another computer system for implementing a software application consistent with an implementation of the present invention.

As shown in FIG. 10, a computer network 1000 for implementing a focus-handling system 100 consistent with an implementation of the present invention may include a server 1002 and a stand-alone PC 1004 connected through a network path 1006. Computer network 1000 may be a local area network (LAN), where server 1002 and PC 1004 are workstations. Computer network 1000 may also be the Internet, with server 1002 hosting a web application and PC 1004 being any workstation available to a user desiring to interface with the application on server 1002. Alternatively, computer network 1000 may be a wide area network (WAN), and server 1002 and PC 1004 may lie in two separate LANs connected through the Internet.

PC 1004 may include a bus line 1008 connecting a plurality of devices such as a processor 1010, memory devices 1012 for storage of information, diskette drives 1014, a fixed disk drive 1016, a monitor 1018, other I/O devices 1020, and a network interface card (NIC) 1022. Processor 1010 may be a microprocessor such as an Intel Pentium™ chip for processing applications. Memory devices 1012 may include read-only memories (ROM) and/or random access memories (RAM). Diskette drives 1014 may include a floppy drive and/or a compact disk (CD) drive. Fixed disk drive 1016 may be a hard drive. I/O devices 1020 may include a keyboard and/or a mouse for receiving input from a user of PC 1004. Monitor 1018 may display output from processor 1010, and may also echo the input of the user. PC 1004 may be connected to network path 1006 through NIC 1022.

An application may be installed on server 1002. An individual desiring to access the application on server 1002 may use a web browser loaded on PC 1004, and may communicate with server 1002 through NIC 1022 and network path 1006. In one aspect, a software application implementing a focus-handling system 100 consistent with an implementation of the present invention may be stored in PC 1004 and processor 1010 of PC 1004 may execute the software application locally within PC 1004 and interface with a web application on server 1002. Particularly, the software application may be stored on a floppy disk or a CD accessible by diskette drive 1014 or on fixed disk drive 1016. In another aspect, the software application comprising a system 100 consistent with an implementation of the present invention may be stored in server 1002, which may execute the software application, and processor 1010 of PC 1004 may communicate with server 1002 to (i) send information to server 1002 and (ii) retrieve the results of the execution of the software application from server 1002.

Through the execution of the software application implementing a focus-handling system 100 consistent with an implementation of the present invention, either locally within PC 1004 or remotely within server 1002, the focus of a web browser on UI elements within a web application may be managed as described above.

Alternatively, as shown in FIG. 11, a stand-alone PC 1100 may be used for executing a software application implementing a focus-handling system 100 consistent with an implementation of the present invention. PC 1100 may include a bus line 1102 connecting a plurality of devices, which may include a processor 1104, memory devices 1106 for storage of information, diskette drives 1108, a fixed disk drive 1110, a monitor 1112, and other I/O devices 1114. Processor 1104 may be a microprocessor such as an Intel Pentium™ chip for processing applications. Memory devices 1106 may include ROM and/or RAM. Diskette drives 1108 may include a floppy drive and/or a compact disk (CD) drive. Fixed disk drive 1110 may be a hard drive. Monitor 1112 may display the output of processor 1104 and may also echo the input of the user. I/O devices 1114 may include a keyboard and/or a mouse for receiving input from a user of PC 1100.

A software application comprising a focus-handling system 100 consistent with an implementation of the present invention may be stored on a floppy disk or a CD accessible by diskette drive 1108 or on fixed disk drive 1110. Processor 1104 may execute the software application stored in the floppy disk the CD or the fixed disk drive 1110. An individual, through monitor 1112 and I/O devices 1114, may interact with processor 1104, which may execute the focus-handling software application.

Focus-handling system 100 may be integrated into a web browser or software application, or may be installed as a plug-in to an existing browser or application. System 100 may also be implemented into any transactional application utilizing frames. System 100 may be run on either the client side or the server side. However, running system 100 on the client side may reduce impact on the server load, improving system efficiency. A software application implementing a focus-handling system 100 consistent with an implementation of the present invention may be written in any number of programming languages, including but not limited to JavaScript, Visual Basic and Flash. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While certain features and embodiments of the invention have been described, other embodiments of the invention will be apparent to those skilled in the art from consideration of the specification and practice of the embodiments of the invention disclosed herein. Further, the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A system for handling the focus of application elements comprising:
    a processor coupled to a memory, the processor operable to:
    load, at a client comprising at least one data processor and memory, an application page of a plurality of application pages visited by a browser running on the client, the application page being received from a server remote from the client and comprising a plurality of elements;
    collect, in a temporary memory at the client, a temporary focus record created upon notification from a specific element of the plurality of elements that the specific element has received a current focus in the application page at the client, the current focus comprising the specific element having user-generated input directed at it in the application page at the client, the temporary focus record comprising an identifier associated with the specific element, a uniform resource identifier value associated with the application page, and a page section at which the specific element is located on the application page;
    insert, at the client, the temporary focus record as a focus record in a focus history, the inserting occurring upon a first server call from the client to one of one or more servers remote from the client, the focus history forming part of a frameset document stored in a persistent memory zone at the client, the focus history comprising one or more focus records for each application page of the plurality of application pages;
    reload, at the client, the application page in response to a second server call to one of the one or more servers remote from the client;
    restore, at the client, focus of the application page on the specific element of the application page, the restoring comprising evaluating the focus records stored in the focus history and identifying the focus record having the uniform resource identifier value associated with the application page and being most recently inserted in the focus history in the frameset document, the restoring further comprising reading the identifier associated with the specific element and the page section at which the specific element is located on the application page from the focus record and setting a focus on the reloaded application page to the specific element based on the reading;
    collect, in the temporary memory at the client, a second temporary focus record created upon notification from a second specific element of the second plurality of elements that the second specific element has received a second current focus in the second application page at the client, the second current focus comprising the second specific element having second user-generated input directed at it in the second application page at the client, the second temporary focus record comprising a second identifier associated with the second specific element, a second uniform resource identifier value associated with the second application page, and a second page section at which the second specific element is located on the second application page;

insert, at the client in response to second receiving of a third input requiring traversal from the second application page to a third application page, the second temporary focus record as a second focus record in the focus history;

reload, at the client, the second application page in response to a fourth input; and second restore, at the client when traversing back to the second application page, focus of the second application page on the second specific element of the second application page, the second restoring comprising evaluating the focus records stored in the focus history and identifying the second focus record having the second uniform resource identifier value associated with the second application page and being most recently inserted in the focus history, the second restoring further comprising reading the second identifier associated with the second specific element and the second page section at which the second specific element is located on the second application page from the second focus record and setting a second focus on the reloaded second application page to the second specific element based on the reading.

2. The system of claim 1, wherein after the processor sets the focus of the application page on an element based on the information corresponding to that element contained in the focus history, the processor is adapted to remove the information corresponding to that element from the focus history.

3. The system of claim 1, wherein the processor is operative to determine that the application page is fully reloaded before setting focus.

4. A system as in claim 1, wherein the processor is further operative to apply a timestamp to the focus record when it is placed in the focus history, and wherein the system determines which element should be placed in focus upon reloading of the application page by determining which focus record associated with the application page has the most recent timestamp.

5. A system of claim 1, wherein the processor is further operative to:

create a new temporary focus record at the client, the new temporary focus record being created upon notification from a second specific element of the plurality of elements that the second specific element has received a second current focus in the application page at the client, the second current focus comprising the second specific element having user-generated input directed at it in the application page at the client, the new temporary focus record comprising a second identifier associated with the second specific element, a second uniform resource identifier value associated with the application page, and a second page section at which the second specific element is located on the application page; and replace the temporary focus record with the new temporary focus record.

6. A system of claim 1, wherein the temporary focus record replaces a previously stored temporary focus record when the temporary focus record is inserted into the focus history.

7. A system of claim 1, wherein the frameset document for the application page is not reloaded in response to the server call to the server remote from the client.

8. The system of claim 1, wherein the first server call and the second server call comprises a single server call to reload the application page.

9. A method for handling the focus of an application page comprising:

loading, at a client comprising memory and at least one data processor, an application page of a plurality of application pages visited by a browser running on the client, the application page being received from a server remote from the client and comprising a plurality of elements;

collecting, in a temporary memory at the client, a temporary focus record created upon notification from a specific element of the plurality of elements that the specific element has received a current focus in the application page at the client, the current focus comprising the specific element having user-generated input is directed at it in the application page at the client, the temporary focus record comprising an identifier associated with the specific element, a uniform resource identifier value associated with the application page, and a page section at which the specific element is located on the application page;

inserting, at the client, the temporary focus record as a focus record in a focus history, the inserting occurring upon a first server call from the client to one of one or more servers remote from the client, the focus history forming part of a frameset document stored in a persistent memory zone at the client, the focus history comprising one or more focus records for each application page of the plurality of application pages;

reloading, at the client, the application page in response to a second server call to one of the one or more servers remote from the client;

restoring, at the client, focus of the application page on the specific element of the application page, the restoring comprising evaluating the focus records stored in the focus history and identifying the focus record having the uniform resource identifier value associated with the application page and being most recently inserted in the focus history in the frameset document, the restoring further comprising reading the identifier associated with the specific element and the page section at which the specific element is located on the application page from the focus record and setting a focus on the reloaded application page to the specific element based on the reading;

collecting, in the temporary memory at the client, a second temporary focus record created upon notification from a second specific element of the second plurality of elements that the second specific element has received a second current focus in the second application page at the client, the second current focus comprising the second specific element having second user-generated input directed at it in the second application page at the client, the second temporary focus record comprising a second identifier associated with the second specific element, a second uniform resource identifier value associated with the second application page, and a second page section at which the second specific element is located on the second application page;

inserting, at the client in response to second receiving of a third input requiring traversal from the second application page to a third application page, the second temporary focus record as a second focus record in the focus history;

reloading, at the client, the second application page in response to a fourth input; and second restoring, at the client when traversing back to the second application page, focus of the second application page on the second specific element of the second application page, the second restoring comprising evaluating the focus records stored in the focus history and identifying the second focus record having the second uniform resource identifier value associated with the second application page and being most recently inserted in the focus history, the second restoring further comprising reading the second identifier associated with the second specific element and the second page section at which the second specific element is located on the second application page from the second focus record and setting a second focus on the reloaded second application page to the second specific element based on the reading.

10. A non-transitory computer-readable medium storing a set of instructions that, when executed by at least one data processor forming part of at least one computing system, performs operations comprising:

loading an application page of a plurality of application pages visited by a browser running on the client, the application page being received from a server remote from the client and comprising a plurality of elements;

collecting, in a temporary memory, a temporary focus record created upon notification from a specific element of the plurality of elements that the specific element has received a current focus in the application page at the client, the current focus comprising the specific element having user-generated input directed at it in the application page at the client, the temporary focus record comprising an identifier associated with the specific element, a uniform resource identifier value associated with the application page, and a page section at which the specific element is located on the application page;

inserting the temporary focus record as a focus record in a focus history, the inserting occurring upon a first server call from the client to one of one or more servers remote from the client, the focus history forming part of a frameset document stored in a persistent memory zone at the client, the focus history comprising one or more focus records for each application page of the plurality of application pages;

reloading the application page in response to a second server call to one of the one or more servers remote from the client;

restoring focus of the application page on the specific element of the application page, the restoring comprising evaluating the focus records stored in the focus history and identifying the focus record having the uniform resource identifier value associated with the application page and being most recently inserted in the focus history in the frameset document, the restoring further comprising reading the identifier associated with the specific element and the page section at which the specific element is located on the application page from the focus record and setting a focus on the reloaded application page to the specific element based on the reading;

collecting, in the temporary memory, a second temporary focus record created upon notification from a second specific element of the second plurality of elements that the second specific element has received a second current focus in the second application page at the client, the second current focus comprising the second specific element having second user-generated input directed at it in the second application page at the client, the second temporary focus record comprising a second identifier associated with the second specific element, a second uniform resource identifier value associated with the second application page, and a second page section at which the second specific element is located on the second application page;

inserting, in response to second receiving of a third input requiring traversal from the second application page to a third application page, the second temporary focus record as a second focus record in the focus history;

reloading the second application page in response to a fourth input; and second restoring, when traversing back to the second application page, focus of the second application page on the second specific element of the second application page, the second restoring comprising evaluating the focus records stored in the focus history and identifying the second focus record having the second uniform resource identifier value associated with the second application page and being most recently inserted in the focus history, the second restoring further comprising reading the second identifier associated with the second specific element and the second page section at which the second specific element is located on the second application page from the second focus record and setting a second focus on the reloaded second application page to the second specific element based on the reading.

11. A computer-implemented method comprising:

loading, at a client comprising memory and at least one data processor, a first application page, the first application page comprising a first plurality of elements;

collecting, in a temporary memory at the client, a first temporary focus record created upon notification from a first specific element of the first plurality of elements that the first specific element has received a first current focus in the first application page at the client, the first current focus comprising the first specific element having first user-generated input directed at it in the first application page at the client, the first temporary focus record comprising a first identifier associated with the first specific element, a first uniform resource identifier value associated with the first application page, and a first page section at which the first specific element is located on the first application page;

first receiving, at the client, a first input requiring traversal from the first application page to a second application page;

inserting, at the client in response to the first receiving, the first temporary focus record as a first focus record in a focus history, the focus history forming part of a frameset document stored in a persistent memory zone at the client;

loading, at the client, the second application page, the second application page comprising a second plurality of elements;

reloading, at the client, the first application page in response to a second input;

first restoring, at the client when traversing back to the first application page, focus of the first application page on the first specific element of the first application page, the first restoring comprising evaluating the focus records stored in the focus history and identifying the first focus record having the first uniform resource identifier value associated with the first application page and being most recently inserted in the focus history, the first restoring further comprising reading the first identifier associated with the first specific element and the first page section at which the first specific element is located on the first application page from the first focus record and setting a first focus on the reloaded first application page to the first specific element based on the reading;

collecting, in the temporary memory at the client, a second temporary focus record created upon notification from a second specific element of the second plurality of elements that the second specific element has received a second current focus in the second application page at the client, the second current focus comprising the second specific element having second user-generated input directed at it in the second application page at the client, the second temporary focus record comprising a second identifier associated with the second specific element, a second uniform resource identifier value associated with the second application page, and a second page section at which the second specific element is located on the second application page;

inserting, at the client in response to second receiving of a third input requiring traversal from the second application page to a third application page, the second temporary focus record as a second focus record in the focus history;

reloading, at the client, the second application page in response to a fourth input;

second restoring, at the client when traversing back to the second application page, focus of the second application page on the second specific element of the second application page, the second restoring comprising evaluating the focus records stored in the focus history and identifying the second focus record having the second uniform resource identifier value associated with the second application page and being most recently inserted in the focus history, the second restoring further comprising reading the second identifier associated with the second specific element and the second page section at which the second specific element is located on the second application page from the second focus record and setting a second focus on the reloaded second application page to the second specific element based on the reading.

12. A method as in claim 11, wherein the focus history is stored in a frameset document at the client that is not reloaded in response to a call of a server remote from the client.

* * * * *